(12) United States Patent
Li

(10) Patent No.: US 6,592,138 B1
(45) Date of Patent: Jul. 15, 2003

(54) STRUCTURE FOR COUPLING WAGON WITH CHILDREN'S TRICYCLE

(76) Inventor: Hsing Li, 17 Yong Hsing Street North District, Taichung City (TW)

( * ) Notice: Subject to any disclaimer, the term of this patent is extended or adjusted under 35 U.S.C. 154(b) by 13 days.

(21) Appl. No.: 10/028,370

(22) Filed: Dec. 28, 2001

(51) Int. Cl.$^7$ ................................................ B62J 39/00
(52) U.S. Cl. ..................... 280/288.4; 280/292; 403/122
(58) Field of Search ............................... 280/288.4, 292, 280/47.34, 87.01, 82, 657, 658, 504; 403/122–149

(56) References Cited

U.S. PATENT DOCUMENTS

| | | | | |
|---|---|---|---|---|
| 3,591,118 A | * | 7/1971 | Gentile et al. | 248/231.71 |
| 3,699,580 A | * | 10/1972 | Joseph et al. | 343/702 |
| 3,962,575 A | * | 6/1976 | Vandenberg et al. | 248/340 |
| 4,261,592 A | * | 4/1981 | Busseuil | 280/292 |
| 4,679,959 A | * | 7/1987 | Cavallaro | 403/143 |
| 5,153,976 A | * | 10/1992 | Benchaar et al. | 29/436 |
| 5,288,093 A | * | 2/1994 | Gross | 280/292 |
| 5,428,519 A | * | 6/1995 | Salmon et al. | 362/421 |
| 5,833,383 A | * | 11/1998 | Bauman | 403/122 |
| 6,050,580 A | * | 4/2000 | Pawelek | 280/204 |
| 6,082,694 A | * | 7/2000 | Joyce | 248/288.31 |
| 6,135,479 A | * | 10/2000 | Tibay et al. | 280/288.4 |
| 6,382,865 B1 | * | 5/2002 | Paxman | 403/131 |

* cited by examiner

Primary Examiner—Lesly D. Morris
Assistant Examiner—L. Lum
(74) Attorney, Agent, or Firm—Rabin & Berdo, P.C.

(57) ABSTRACT

A wagon-linking structure comprises a fastening seat and a connection rod. The fastening seat is provided with a first stepped hole and a second stepped hole smaller in hole diameter than the first stepped hole. The connection rod has a shank and a semicircular body. The connection rod is engaged with the fastening seat such that the semicircular body is rotatably received in the first stepped hole of the fastening seat, and that the shank of the connection rod is jutted out of the fastening seat via the second stepped hole of the fastening seat. The fastening seat is fixed with the front end of a wagon.

2 Claims, 6 Drawing Sheets

FIG.1-A

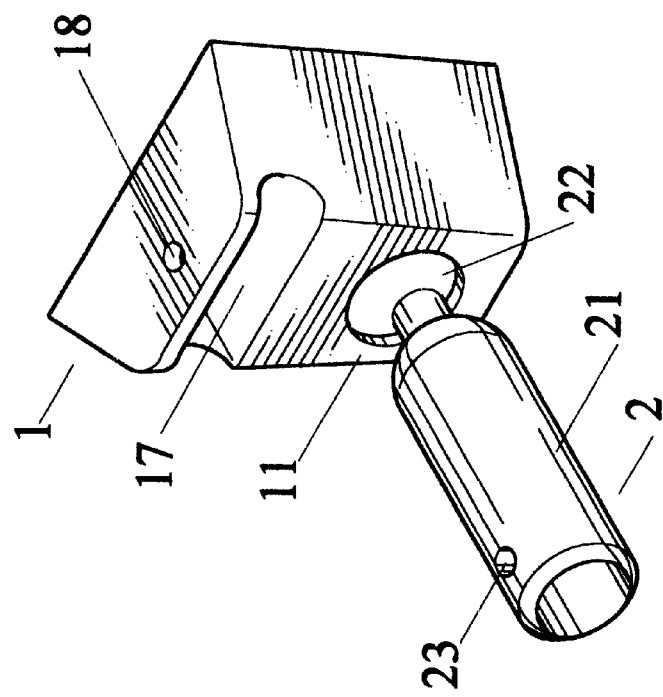
FIG.1-B
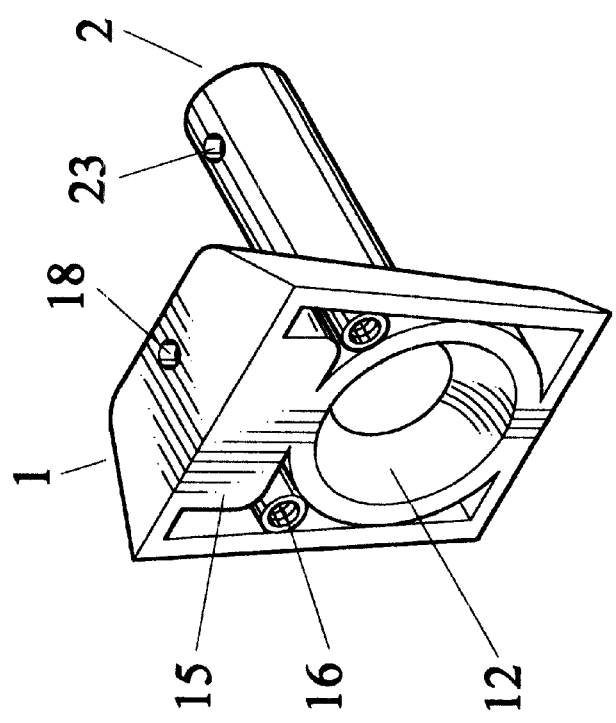
FIG.1-C

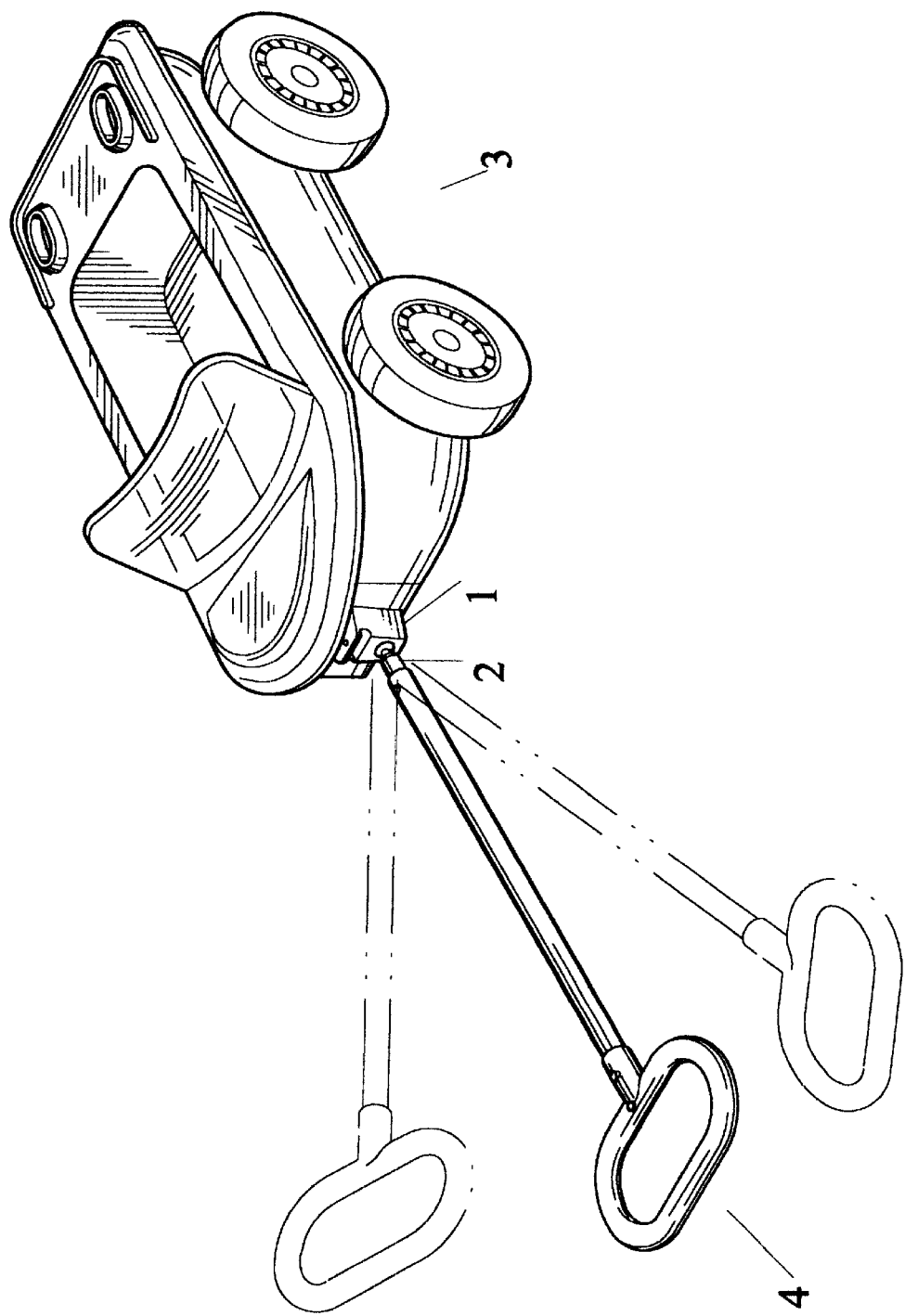
FIG.2-A

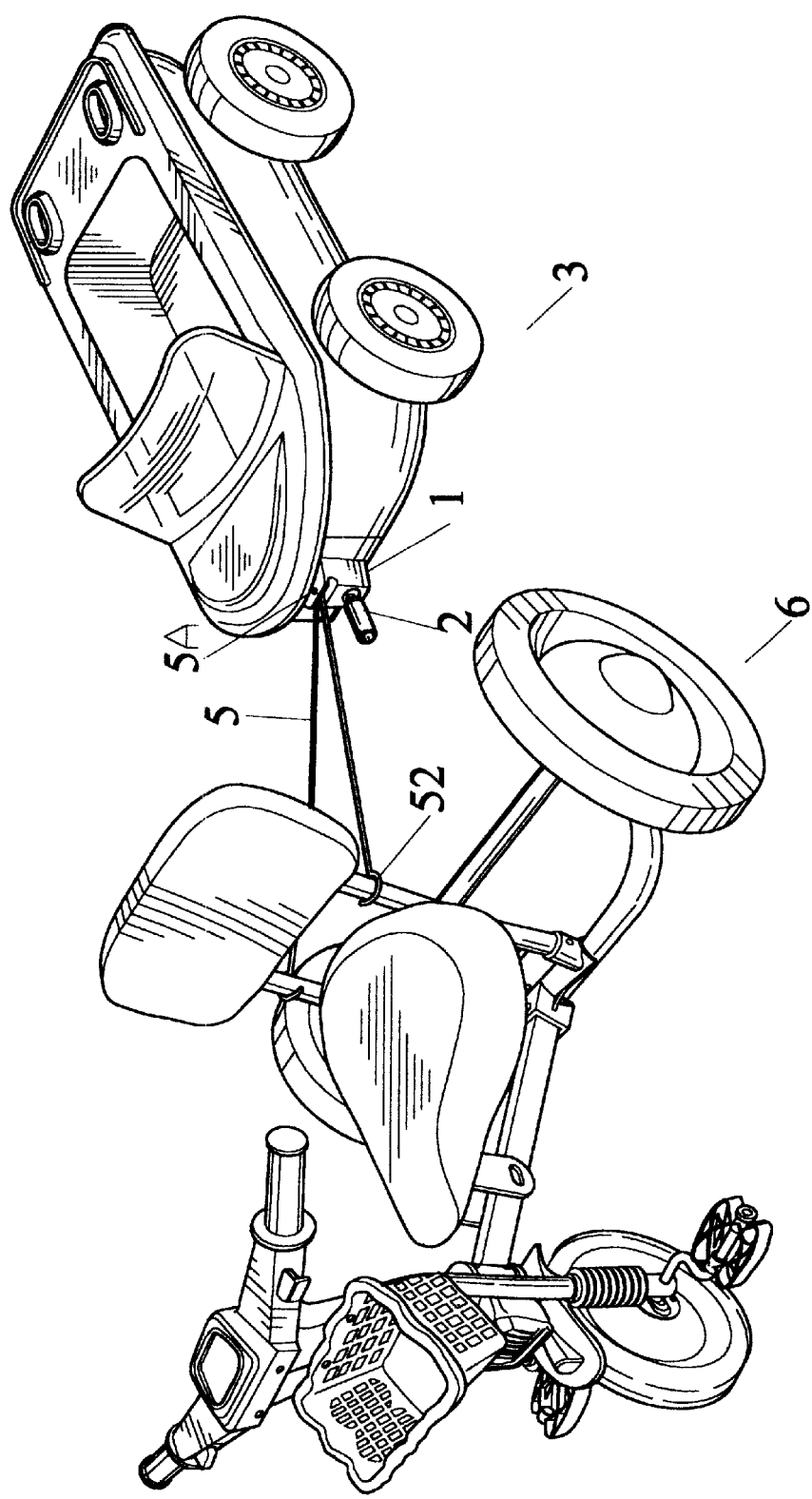
FIG.3-A

STRUCTURE FOR COUPLING WAGON WITH CHILDREN'S TRICYCLE

FIELD OF THE INVENTION

The present invention relates generally to a children's tricycle, and more particularly to a structure for linking the children's tricycle and a wagon.

BACKGROUND OF THE INVENTION

The conventional children's tricycle is generally provided with a rack which is mounted on the rear frame of the tricycle in conjunction with an inverted U-shaped frame and a shaft such that the rack is located over the two rear wheels of the tricycle.

There is another conventional children's tricycle which is provided with a wagon fastened thereto by a cord. The coupling of the wagon with the tricycle by means of the cord or the like is rather primitive and inconvenient in design in that the wagon is vulnerable to overturn, and that the wagon is apt to hinder the maneuverability of the tricycle.

SUMMARY OF THE INVENTION

The primary objective of the present invention is to provide a children's tricycle with means to link a wagon with the children's tricycle without the shortcomings of the conventional means described above.

In keeping with the principle of the present invention, the foregoing objective of the present invention is attained by a wagon coupler comprising a fastening seat and a connection rod. The fastening seat is provided with a large stepped hole and a small stepped hole. The connection rod has a shank and a semicircular body. The connection rod is joined with the fastening seat such that the semicircular body of the connection rod is rotatably received in the large stepped hole of the fastening seat, and that the shank of the connection rod is jutted out of the fastening seat via the small stepped hole. The fastening seat is fixed with the front end of a wagon such that the free end of the connection rod is fastened with a pole handle. In light of the semicircular body of the connection rod being rotatably received in the large stepped hole of the fastening seat, the shank of the connection rod is capable of turning along with the semicircular body so as to enhance the maneuverability of the tricycle with the wagon being coupled therewith.

The features and the advantages of the present invention will be more readily understood upon a thoughtful deliberation of the following detailed description of the preferred embodiments of the present invention with reference to the accompanying drawings.

BRIEF DESCRIPTION OF THE DRAWINGS

FIG. 1A shows an exploded view of the first preferred embodiment of the present invention.

FIG. 1B shows a perspective view of the first preferred embodiment of the present invention in combination.

FIG. 1C shows another perspective view of the first preferred embodiment of the present invention in combination.

FIG. 2A shows a schematic view of the first preferred embodiment of the present invention after installation.

FIG. 3A shows a schematic view of the second preferred embodiment of the present invention at work.

DETAILED DESCRIPTION OF THE EMBODIMENT

Figure 1:
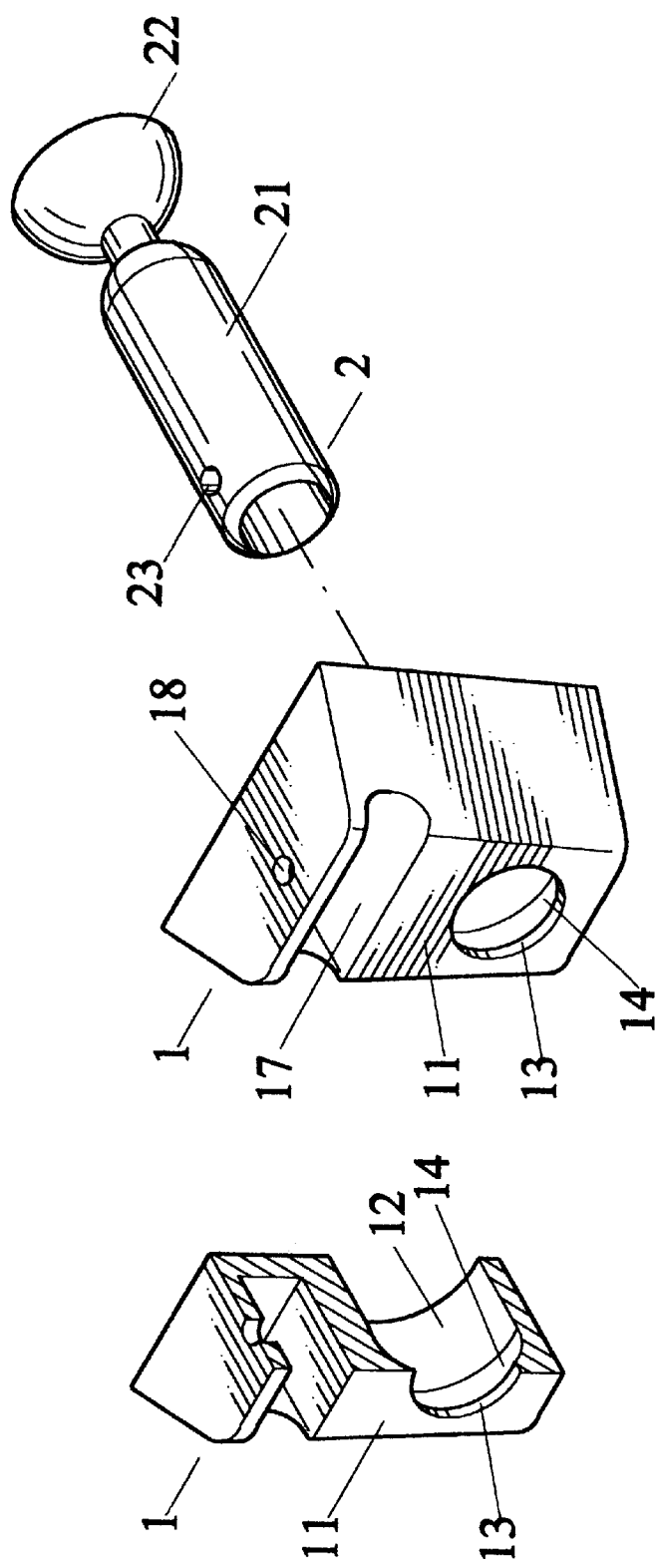
FIG. 1 shows a partial sectional view of a first preferred embodiment of the present invention.

As shown in FIGS. 1A–2A, a structure of the first preferred embodiment of the present invention comprises a fastening seat 1, a connection rod 2, and a pole handle 4.

The fastening seat 1 has a main body 11 which is provided in the interior with a large stepped hole 12 located in proximity of the rear side of the main body 11, a small stepped hole 13 located in proximity of the front side of the main body 11, and a surface 14 located between the large stepped hole 12 and the small stepped hole 13. The main body 11 is further provided in the front side with an arcuate slot 17 and a through hole 18 in communication with the arcuate slot 17.

Figure 2:
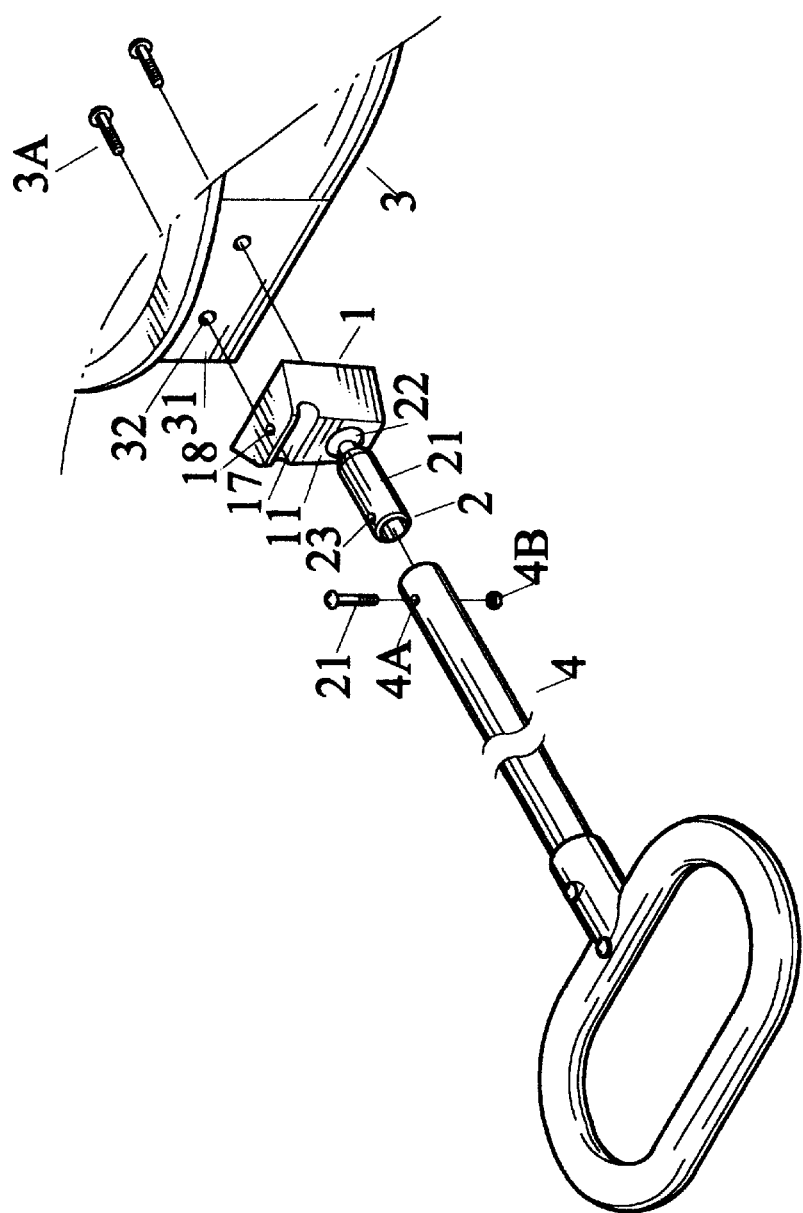
FIG. 2 shows a schematic view of the first preferred embodiment of the present invention prior to installation.

The connection rod 2 has a shank 21, a semicircular body 22 fastened at one end of the shank 21, and a threaded hole 23 located in proximity of other end of the shank 21. The connection rod 2 is joined with the fastening seat 1 such that the semicircular body 22 is rotatably received in the large stepped hole 12 of the fastening seat 1, and that the shank 21 is jutted out of the fastening seat 1 via the small stepped hole 13 of the fastening seat 1. The shank 21 is fastened at other end thereof with the pole handle 4 by a bolt 4A and a nut 4B. The pole handle 4 is provided at one end with a through hole 41. The pole handle 4 is fastened with the shank 21 such that the bolt 4A is received in the through hole 41 and the threaded hole 23 of the shank 21, as illustrated in FIG. 2.

The fastening seat 1 is fastened at the rear side 15 with a front end 31 of a wagon 3. The rear side 15 of the fastening seat 1 is provided is provided with two threaded holes 16, as shown in FIG. 1C. The front end 31 of the wagon 3 is provided with two through holes 32 corresponding in location to the two threaded holes 16 of the rear side 15 of the fastening seat 1. The fastening seat 1 is fastened to the front end 31 of the wagon 3 by two fastening screws 3A, which are engaged with the two threaded holes 16 of the fastening seat 1 via the two through holes 32 of the wagon 3.

In light of the semicircular body 22 of the connection rod 2 being rotatably received in the large stepped hole 12 of the fastening seat 1 the pole handle 4 is greatly enhanced in its maneuverability, as illustrated in FIG. 2A. As a result, the wagon 3 is less vulnerable to overturn.

Figure 3:
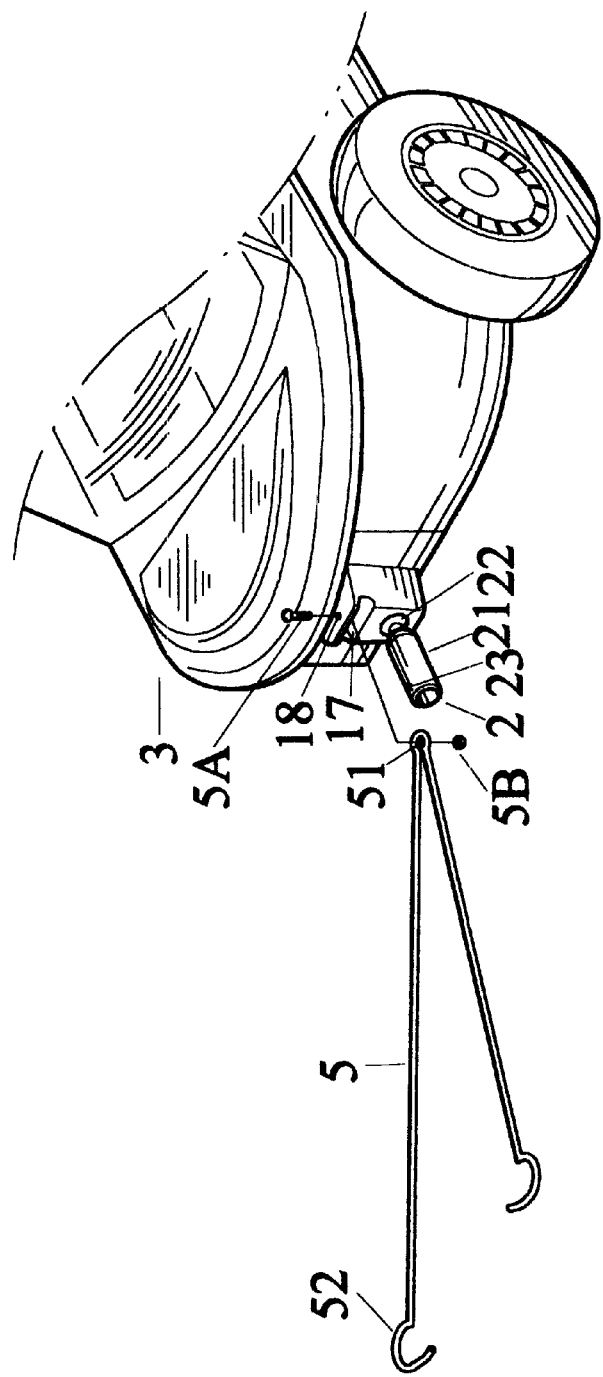
FIG. 3 shows a schematic view of a second preferred embodiment of the present invention prior to installation.

As illustrated in FIGS. 3 and 3A, the wagon 3 is linked with a children's tricycle 6 by a V-shaped link 5. The V-shaped link 5 has one end with an arcuate hole 51, and two hooked portions 52. The wagon 3 is linked with the tricycle 6 by the link 5 such that the two hooked portions 52 are retained by the rear frame of the tricycle 6, and that one end of the link 5 is fastened with the fastening seat 1 by a bolt 5A and a nut 5B, with the bolt 5A being put through the arcuate hole 51 of the link 5 via the through hole 18 of the front side of the fastening seat 1.

The embodiments of the present invention described above are to be regarded in all respects as being illustrative and nonrestrictive. Accordingly, the present invention may be embodied in other specific forms without deviating from the spirit thereof. The present invention is therefore to be limited only by the scopes of the following claims.

What is claimed is:

1. A wagon-linking structure comprising:
   a fastening seat provided in an interior with a first stepped hole which is located in proximity of a rear side of said fastening seat, said rear side being provided with a plurality of threaded holes, said fastening seat further provided in the interior with a second stepped hole which is smaller in hole diameter than said first stepped hole and is located in proximity of a front side of said fastening seat, said front side being provided with an arcuate slot and a through hole in communication with said arcuate slot; and a connection rod having a shank and a semicircular body fastened with one end of said shank, said shank being provided at another end with a threaded hole, said connection rod being joined with said fastening seat such that said semicircular body is rotatably received in said first stepped hole of said fastening seat, and that said shank is jutted out of said fastening seat via said second stepped hole of said fastening seat;

said fastening seat being fastened with a front end of a wagon by a plurality of fastening screws which are engaged with said threaded holes of said rear side of said fastening seat via a plurality of through holes of the front end of the wagon.

2. The wagon-linking structure as defined in claim 1 further comprising a V-shaped link which is provided with an arcuate hole, and two hooked portions opposite in location to said arcuate hole whereby V-shaped link is fastened at said arcuate hole with said fastening seat in conjunction with a fastening bolt which is received in said arcuate hole of said V-shaped link via said through hole of said front side of said fastening seat, said V-shaped link serving to link the wagon with a tricycle in such a manner that said two hooked portions of said V-shaped link are retained by a rear frame of the tricycle.

\* \* \* \* \*